United States Patent
Tong et al.

(10) Patent No.: US 9,268,186 B2
(45) Date of Patent: Feb. 23, 2016

(54) ARRAY SUBSTRATE, DISPLAY PANEL AND DISPLAY DEVICE

(71) Applicants: HEFEI BOE OPTOELECTRONICS AND TECHNOLOGY CO., LTD., Anhui (CN); BOE TECHNOLOGY GROUP CO., LTD., Beijing (CN)

(72) Inventors: Ran Tong, Beijing (CN); Yonggang Du, Beijing (CN); Manping Niu, Beijing (CN); Lina Wang, Beijing (CN); Bin Wu, Beijing (CN)

(73) Assignees: HEFEI BOE OPTOELECTRONICS TECHNOLOGY CO., LTD., Hefei, Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 76 days.

(21) Appl. No.: 14/068,753

(22) Filed: Oct. 31, 2013

(65) Prior Publication Data

US 2014/0118658 A1    May 1, 2014

(30) Foreign Application Priority Data

Oct. 31, 2012    (CN) .......................... 2012 1 0429246

(51) Int. Cl.
*G02F 1/1345*    (2006.01)
*G02F 1/1362*    (2006.01)

(52) U.S. Cl.
CPC ........ *G02F 1/136259* (2013.01); *G02F 1/1345* (2013.01); *G02F 2001/136263* (2013.01); *G02F 2001/136272* (2013.01)

(58) Field of Classification Search
CPC .......................... G02F 1/136259; G02F 1/1345
USPC ...................................... 349/54–55
See application file for complete search history.

(56) References Cited

U.S. PATENT DOCUMENTS 5,202,778 A * 4/1993 Niki .................................. 349/54
7,936,410 B2 * 5/2011 Oh et al. ........................ 349/54

FOREIGN PATENT DOCUMENTS

| CN | 1967364 A | 5/2007 |
| CN | 101533188 A | 9/2009 |
| CN | 102004335 A | 4/2011 |

OTHER PUBLICATIONS

First Chinese Office Action dated Sep. 2, 2014; Appln. No. 201210429246.1.

* cited by examiner

*Primary Examiner* — James Dudek
(74) *Attorney, Agent, or Firm* — Ladas & Parry LLP

(57) ABSTRACT

Embodiments of the invention provide an array substrate, a display panel and a display device. The array substrate comprises: a plurality of data lines extending in a first direction, a counter substrate region, a plurality of data pad regions and a data repair line extending in a second direction. The counter substrate region is a projection region of a counter substrate on the array substrate after the counter substrate and the array substrate are bonded together. One end of several data lines is disposed in one data pad region, and the plurality of data pad regions are disposed on one side of the array substrate and positioned outside the counter substrate region. The data repair line is provided inside the counter substrate region, along an edge of the counter substrate region and is proximate to the plurality of data pad regions.

15 Claims, 2 Drawing Sheets

ARRAY SUBSTRATE, DISPLAY PANEL AND DISPLAY DEVICE

TECHNICAL FIELD

Embodiments of the invention relate to an array substrate, a display panel and a display device.

BACKGROUND

At present, as for a display device such as TFT-LCD, a repair method as shown in FIG. 1 is generally used to repair a broken data line 1. By using lasers, one end of the broken data line 1 is welded together with a lateral data repair line 21, the other end thereof is welded together with an outer annular repair line 22 or an inner annular repair line 23, and then a cutting process is performed at corresponding positions on the data repair line 21. In this way, both ends of the broken data line 1 are connected with each other and the broken data line 1 is repaired. In FIG. 1, the sign "x" on the data line 1 represents a broken point, the sign "•" represents a laser welding point, and the sign "/" represents a laser cutting point and the dotted lines represent portions of the outer annular repair line 22 and the inner annular repair line 23 that are provided outside the panel.

However, as the lateral data line 21 is disposed in the proximity of an upper side edge of a pixel region 3, only the broken data line with the broken point inside the pixel region 3 can be repaired. If the broken point of the broken data line is located outside the pixel region 3, specifically, if the broken point of the broken date line is located at a position outside the pixel region 3 and far away from the upper side edge of the pixel region 3, the broken date line can not be repaired.

SUMMARY

According to one aspect of the invention, an array substrate is provided. 1. The array substrate comprises: a plurality of data lines extending in a first direction, a counter substrate region, a plurality of data pad regions and a data repair line extending in a second direction. The counter substrate region is a projection region of a counter substrate on the array substrate after the counter substrate and the array substrate are bonded together. One end of several data lines is disposed in one data pad region, and the plurality of data pad regions are disposed on one side of the array substrate and positioned outside the counter substrate region. The data repair line is provided inside the counter substrate region, along an edge of the counter substrate region and is proximate to the plurality of data pad regions.

For example, a distance L between the data repair line and the edge of the counter substrate region 4 is 0.2 mm≤L≤1 mm.

For example, the distance L between the data repair line and the edge of the counter substrate region 4 is 0.4 mm.

For example, the data repair line is divided into a plurality of segments that are separated from each other, and each segment corresponds to one data pad region or several data pad regions.

For example, the data repair line is a continuous data repair line.

For example, the array substrate further comprises: an outer annular repair line; a first lead provided on the outer annular repair line and connected to the outer annular repair line; and a first connection line for connecting the data repair line to the outer annular repair line or the first lead.

For example, an insulating layer is provided between a layer in which the first connection line is provided and a layer in which the data repair line, the outer annular repair line and the first lead are provided.

For example, the array substrate further comprises: an inner annular repair line; a second lead provided on the inner annular repair line and connected to the inner annular repair line; a second connection line for connecting the data repair line to the inner annular repair line or the second lead.

For example, an insulating layer is provided between a layer in which the second connection line is provided and a layer in which the data repair line, the inner annular repair line and the second lead are provided.

For example, the array substrate further comprises: an outer annular repair line and an inner annular repair line; a first lead provided on the outer annular repair line and connected to the outer annular repair line; a second lead provided on the inner annular repair line and connected to the inner annular repair line; a first connection line and a second connection line. The first connection line is used for connecting the data repair line to the outer annular repair line or the first lead. The second connection line is used for connecting the data repair line to the inner annular repair line or the second lead. An insulating layer is provided between a layer in which the first connection line is provided and a layer in which the data repair line, the outer annular repair line and the first lead are located. An insulating layer is provided between a layer in which the second connection line is provided and a layer in which the data repair line, the outer annular repair line and the second lead are provided.

For example, the array substrate further comprises a pixel region. The pixel region is provided in a range of the counter substrate region, an area of the counter substrate region is larger than that of the pixel region, and the data repair line is provided outside the pixel region.

For example, the data repair line has a width of 8 μm-10 μm.

For example, the data repair line has the width of 10 μm.

According to another aspect of the invention, a display panel is provided. The display panel comprises a counter substrate and the above array substrate.

According to still another aspect of the invention, a display device is provided. The display device comprises the above display panel.

BRIEF DESCRIPTION OF THE DRAWINGS

In order to clearly illustrate the technical solution of the embodiments of the invention or in the prior art, the drawings adopted in the embodiments or in the prior art will be briefly described in the following; it is obvious that the described drawings are only related to some embodiments of the invention and those skilled in the art may also obtain other figures according to the figures without paying any creative work.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
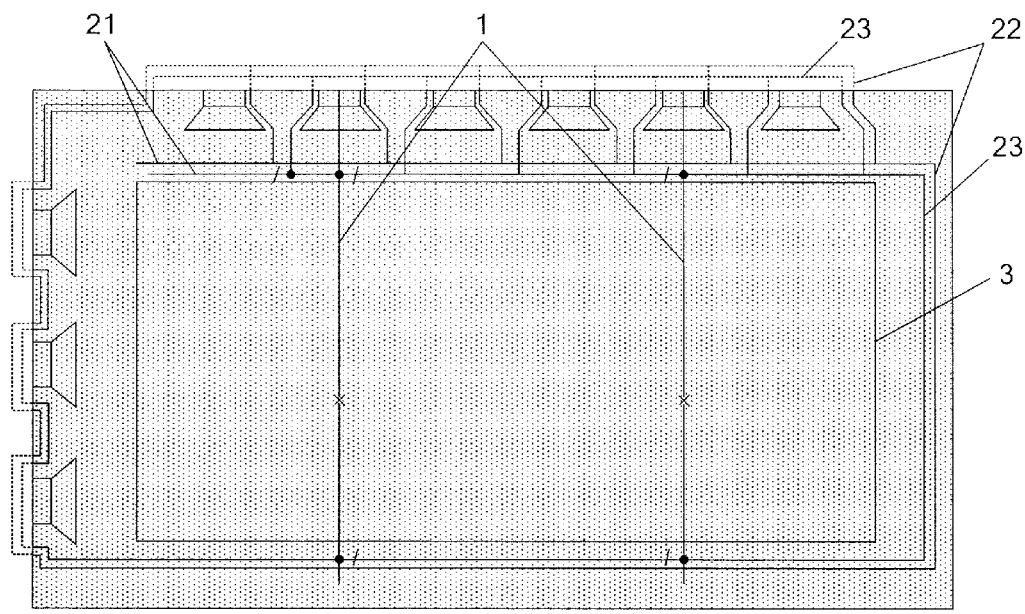
FIG. 1 is a schematic structural view illustrating a conventional array substrate.
Figure 2:
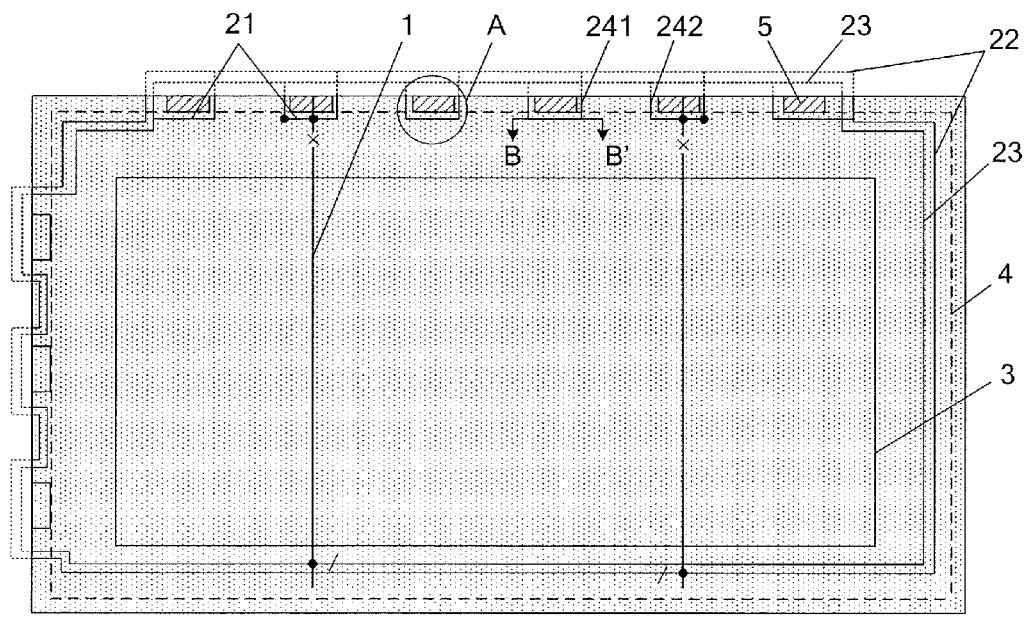
FIG. 2 is a schematic structural view illustrating an array substrate according to an embodiment of the invention.

As shown in FIG. 2, an array substrate according to an embodiment of the invention comprises: a plurality of data lines 1 extending in a first direction, a plurality of gate lines (not shown in the figures) extending in a second direction, a pixel region 3, a counter substrate region 4, a plurality of data pad regions 5, an outer annular repair line 22, an inner annular repair line 23, and a data repair line 21 extending in the second direction.

The first direction is substantially perpendicular to the second direction. For example, the first direction is the longitudinal direction in FIG. 2, and the second direction is the lateral direction in FIG. 2.

In the pixel region 3, the plurality of data lines and the plurality of gate lines intersect with each other to define a plurality of pixel units. The plurality of pixel units are used for displaying an image. The pixel region 3 may also be called as a display region. One end of several data lines 1 is disposed in one data pad region 5 so that a test signal is provided to the data lines 1 by a data pad during a testing process and a data signal is input to the data lines 1 during an operating process. The plurality of the data pad regions 5 are disposed on one side of the array substrate and positioned outside the counter substrate region 4. The counter substrate region 4 is a projection region of a counter substrate on the array substrate after the array substrate and the counter substrate are bonded together. For example, the counter substrate may be color filter substrate. The pixel region 3 is positioned in the range of the counter substrate region 4, and an area of the counter substrate region 4 is larger than that of the pixel region 3. The data pad regions 5 are positioned outside the counter substrate region 4 for facilitating the signal input. The data repair line 21 is disposed outside the pixel region 3, inside the counter substrate region 4, along an edge of the counter substrate region 4 and proximate to the data pad regions 5. The edge of the counter substrate region 4 refers to the boundary line of the counter substrate region 4. The date repair line 21 is disposed inside the counter substrate region 4 so as to prevent the date repair line 21 from exposing outside the counter substrate after the array substrate and counter substrate are boned together, and in this way, the focusing during the laser welding process can be more easier and the damage to the data repair line 21 can be avoided. The outer annular repair line 22 and the inner annular repair line 23 are closed annular lines respectively, and their structures are as shown in FIG. 2. In FIG. 2, the dotted lines on the outer annular repair line 22 and the inner annular repair line 23 are portions provided outside the array substrate.

In FIG. 2, the sign "x" on the data line 1 represents a broken point, the sign "•" represents a laser welding point, and the sign "/" represents a laser cutting point. As an example, FIG. 2 shows two broken data lines 1, whose broken points are outside the pixel region 3.

For example, as for the broken data line 1 on the left side of FIG. 2, it may be repaired in the following steps. By using laser, one end of the left broken data line 1 and the data repair line 21 are welded together at their intersecting point on the upper side of the substrate, the data repair line 21 and the inner annular repair line 23 are welded together, and the other end of the left broken data line 1 and the inner annular repair line 23 are welded together at their intersecting point on the lower side of the substrate. In this way, both ends of the left broken data line 1 are connected by the data repair line 21 and the inner annular repair line 23, so that the left broken data line 1 is repaired. In addition, during the above repairing process, only a left portion of the inner annular repair line 23 is used, so the inner annular repair line 23 may be cut on the right side of the welding point of the left broken data line 1 and the inner annular repair line 23 so as to reduce the power consumption.

For example, as for the broken data line 1 on the right side in FIG. 2, it may be repaired in the following steps. By using laser, one end of the right broken data line 1 and the data repair line 21 are welded together at their intersecting point on the upper side of the array substrate, the data repair line 21 and the outer annular repair line 22 are welded together, and the other end of the broken data line 1 and the outer annular repair line 22 are welded together at their intersecting point on the lower side of the array substrate. In this way, both ends of the right broken data line 1 are connected by the data repair line 21 and the outer annular repair line 22, so that the right broken data line 1 is repaired. In addition, during the above repairing process, only a right portion of the outer annular repair line 22 is used, so the outer annular repair line 22 may be cut on the left side of the welding point of the right broken data line 1 and the outer annular repair line 22 so as to reduce the power consumption.

It should be noted that the data repair line 21 may be divided into a plurality of segments that are separated from each other, or the data repair line 21 may be a continuous data repair line. When the data repair line is divided into the plurality of segments, each segment may correspond to one data pad region 5 (as shown in FIG. 2) or several data pad regions 5. When the data repair line is the continuous data repair line or each segment of data repair line corresponds to several data pad regions 5, the data repair line needs to be cut at suitable position after the broken data line 1 is repaired.

In addition, when the data repair line 21 is divided into the plurality of segments, the segments are separated from each other naturally and will not influence each other. Therefore, comparing with the case that the data repair line 21 is continuous, the data repair line 21 may not be cut (for example, in the case that each segment of data repair line 21 corresponds to one data pad region 5) or the times of cutting the data repair line may be reduced (in the case that each segment of data repair line 21 corresponds to several data pad regions 5) during the repairing process. In this way, the repairing process can be simplified.

It should be noted that the above data pad regions 5 may be either disposed on the upper side of the array substrate as shown in FIG. 2, or disposed on the lower side of the array substrate. When the data pad regions 5 is disposed on the lower side of the array substrate, the corresponding data repair line 21 is also disposed on the lower side the array substrate, and in this case, the structure of the array substrate is similar with that shown in FIG. 2 and the details thereof are omitted here.

Figure 3:
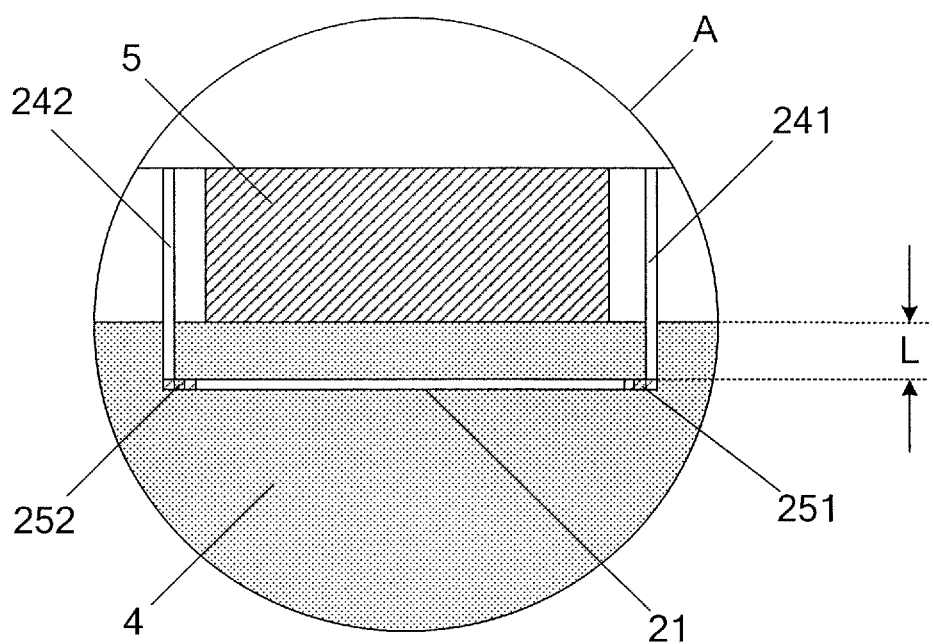
FIG. 3 is a enlarged schematic view illustrating Part A in FIG. 2.

As shown in FIG. 3, a distance L between the data repair line 21 and the edge of the counter substrate region 4 is less than or equal to 1 mm.

For example, the outer annular repair line 22 and the inner annular repair line 23 are provided with leads respectively. As shown in FIG. 2 and FIG. 3, the outer annular repair line 22 is provided with a first lead 241 connected to the outer annular repair line 22, the inner annular repair line 23 is provided with a second lead 242 connected to the inner annular repair line 23. For example, the first lead 241 may be arranged in the same layer as the outer annular repair line 22, and the second lead 242 may be arranged in the same layer as the inner annular repair line 23.

Figure 4:
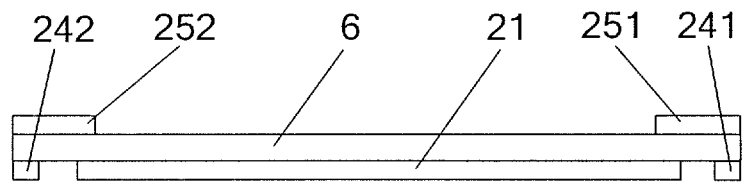
FIG. 4 is a sectional view taken along B-B' line in FIG. 2.

In addition, according to the embodiment of the invention, the array substrate further comprises a first connection line 251 and a second connection line 252. The first connection line 251 is used to connect the data repair line 21 to the outer annular repair line 22 or the first lead 241. For example, as shown in FIG. 3 and FIG. 4, projections of two ends of the first connection line 251 on the array substrate respectively intersect with the projections of the first lead 241 and the data repair line 21 on the array substrate. The first lead 241 and the data repair line 21 are provided in a same layer, the first connection line 251 is provided in a different layer, and an insulating layer 6 is provided between the layer in which the first connection line 251 is provided and the layer in which the data repair line 21 and the first connection line 241 are provided. During repairing the broken data line, two ends of the first connection line 251 are respectively connected to the data repair line 21 and the first lead 241 by laser welding process, thus the data repair line 21 is connected to the first lead 241 by the first connection line 251. Likewise, the second connection line 252 is used to connect the data repair line 21 to the inner annular repair line 23 or the second lead 242. The second connection line 252 may be arranged in the similar way as the first connection line 251.

Before repairing the broken data line 1, the data repair line 21 is not connected to the outer annular repair line 22 or the inner annular repair line 23. When repairing the broken data line 1, the data repair line 21 is connected to the outer annular repair line 22 by the first connection line 251 and the first lead 241, and the data repair line 21 is connected to the inner annular repair line 23 by the second connection line 252 and the second lead 242.

As for each of the data pad regions 5 located at the intermediate portion of the array substrate, its left and right sides are respectively provided with the first lead 241 connecting with the outer annular repair line 22 and the second lead 242 connecting with the inner annular repair line 23. As for the data pad region 5 on the leftmost side of the array substrate, its left side may be not provided with the second lead 242 connecting with the inner annular repair line 23, and the inner annular repair line 23 is welded together with the data repair line 21 merely by the second connection line 252. Likewise, as for the data pad region 5 on the rightmost side of the array substrate, its right side may be not provided with the first lead 241 connecting with the outer annular repair line 22, and the outer annular repair line 22 is welded together with the data repair line 21 merely by the first connection line 251.

Furthermore, the distance L between the data repair line 21 and the edge of the counter substrate region 4 is larger than or equal to 0.2 mm. The counter substrate region 4 is used to place the counter substrate, and the cutting of the counter substrate is performed after the counter substrate and the array substrate are bonded together. When L is larger than or equal to 0.2 mm, even if there is an error in cutting the counter substrate, the data repair line 21 can be ensured to be covered by the counter substrate.

Preferably, the distance L between the data repair line 21 and the edge of the counter substrate region 4 is 0.4 mm.

For example, the data repair line 21 has a width of 8 µm-10 µm. Preferably, the data repair line 21 has a width of 10 µm.

In addition, the data lines 1 are distributed uniformly in the pixel region 3, and the data lines 1 are in radial distribution on the lower side of each data pad region 5. Therefore, the data lines are more focused in each data pad region 5. Therefore, when the data repair line 21 is proximate to the upper edge of the array substrate, each segment of the data repair line 21 may be formed to be shorter if only enough to cover the data line within the data pad region 5. In addition, when each segment of the data repair line 21 is shorter, the welding point between the data line 1 and the data repair line 21 is closer to the welding point between the data repair line 21 and the lead, and thus the repair of the broken data line can be more convenient.

It should be noted that one inner annular repair line and one outer annular repair line are shown in FIG. 3 as an example. According to the practical requirements, only the inner annular repair line may be provided, or only the outer annular repair line may be provided. In addition, according to the practical requirements, a plurality of the inner annular repair lines and/or a plurality of the outer annular repair line may be provided.

According to the embodiment of the invention, as the data repair line 21 is arranged along the edge of the counter substrate region 4, the data repair line 21 is located more upward, that is, the data repair line 21 is closer to the edge of the array substrate but further away from the edge of the pixel region 3. Thus, the case that the broken data line with the broken point outside the pixel region cannot be repaired by the data repair line in the conventional technology can be avoided, and more broken data lines can be repaired. In addition, according to the embodiment of the invention, as the data repair line 21 may be divided into the plurality of segments, the length of each segment of the data repair line 21 reduces, and thus possibilities of causing other defects or the data repair line being damaged in subsequent process can be reduced and the repair of the broken data line can be more convenient.

The embodiment of the invention further provides a display panel, and the display panel comprises a counter substrate and the above array substrate. The counter substrate is disposed in the counter substrate region of the above array substrate.

The embodiment of the invention further provides a display device, and the display device comprises the above panel. The display device may be LCD panel, electronic paper, OLED panel, mobile phone, tablet computer, TV, display, notebook PC, digital photo frame, navigator or any other product or component having a display function.

The foregoing embodiments merely are exemplary embodiments of the invention, and not intended to define the scope of the invention, and the scope of the invention is determined by the appended claims.

What is claimed is:

1. An array substrate, comprising: a plurality of data lines extending in a first direction, a counter substrate region, a plurality of data pad regions and a data repair line extending in a second direction, wherein
    the counter substrate region is a projection region of a counter substrate on the array substrate after the counter substrate and the array substrate are bonded together;
    one end of several data lines is disposed in one data pad region, and the plurality of data pad regions are disposed on one side of the array substrate and positioned outside the counter substrate region; and
    the data repair line is provided inside the counter substrate region, along an edge of the counter substrate region and is proximate to the plurality of data pad regions.

2. The array substrate according to claim 1, wherein a distance L between the data repair line and the edge of the counter substrate region 4 is 0.2 mm≤L≤1 mm.

3. The array substrate according to claim 1, wherein the distance L between the data repair line and the edge of the counter substrate region 4 is 0.4 mm.

4. The array substrate according to claim 1, wherein the data repair line is divided into a plurality of segments that are separated from each other, and each segment corresponds to one data pad region or several data pad regions.

5. The array substrate according to claim 1, wherein the data repair line is a continuous data repair line.

6. The array substrate according to claim 1, further comprising:
   an outer annular repair line;
   a first lead provided on the outer annular repair line and connected to the outer annular repair line; and
   a first connection line for connecting the data repair line to the outer annular repair line or the first lead.

7. The array substrate according to claim 6, wherein an insulating layer is provided between a layer in which the first connection line is provided and a layer in which the data repair line, the outer annular repair line and the first lead are provided.

8. The array substrate according to claim 1, further comprising:
   an inner annular repair line;
   a second lead provided on the inner annular repair line and connected to the inner annular repair line;
   a second connection line for connecting the data repair line to the inner annular repair line or the second lead.

9. The array substrate according to claim 8, wherein an insulating layer is provided between a layer in which the second connection line is provided and a layer in which the data repair line, the inner annular repair line and the second lead are provided.

10. The array substrate according to claim 1, further comprising:
    an outer annular repair line and an inner annular repair line;
    a first lead provided on the outer annular repair line and connected to the outer annular repair line;
    a second lead provided on the inner annular repair line and connected to the inner annular repair line;
    a first connection line and a second connection line, wherein
    the first connection line is used for connecting the data repair line to the outer annular repair line or the first lead;
    the second connection line is used for connecting the data repair line to the inner annular repair line or the second lead;
    an insulating layer is provided between a layer in which the first connection line is provided and a layer in which the data repair line, the outer annular repair line and the first lead are located; and
    an insulating layer is provided between a layer in which the second connection line is provided and a layer in which the data repair line, the outer annular repair line and the second lead are provided.

11. The array substrate according to claim 1, further comprising a pixel region, wherein
    the pixel region is provided in a range of the counter substrate region, an area of the counter substrate region is larger than that of the pixel region, and the data repair line is provided outside the pixel region.

12. The array substrate according to claim 1, wherein the data repair line has a width of 8 μm-10 μm.

13. The array substrate according to claim 1, wherein the data repair line has the width of 10 μm.

14. A display panel, comprising a counter substrate and the array substrate according to claim 1.

15. A display device, comprising a display panel according to claim 14.

* * * * *